(12) United States Patent
Opem et al.

(10) Patent No.: US 7,712,089 B2
(45) Date of Patent: May 4, 2010

(54) REVALIDATION OF A COMPILER FOR SAFETY CONTROL

(75) Inventors: Audun Opem, Ski (NO); Mats Gunnmarker, Oslo (NO); Kai Hansen, Oslo (NO)

(73) Assignee: ABB AS, Billingstad (NO)

( * ) Notice: Subject to any disclaimer, the term of this patent is extended or adjusted under 35 U.S.C. 154(b) by 490 days.

(21) Appl. No.: 10/519,151

(22) PCT Filed: Jun. 27, 2003

(86) PCT No.: PCT/IB03/02720

§ 371 (c)(1),
(2), (4) Date: Oct. 14, 2005

(87) PCT Pub. No.: WO2004/003739

PCT Pub. Date: Jan. 8, 2004

(65) Prior Publication Data

US 2006/0101433 A1    May 11, 2006

(30) Foreign Application Priority Data

Jun. 28, 2002   (SE) .................................. 0202019

(51) Int. Cl.
*G06F 9/45* (2006.01)
*G06F 9/44* (2006.01)

(52) U.S. Cl. ..................................... 717/140; 717/124
(58) Field of Classification Search .................. None
See application file for complete search history.

(56) References Cited

U.S. PATENT DOCUMENTS 5,359,659 A    10/1994   Rosenthal (Continued)

FOREIGN PATENT DOCUMENTS

| DE | 19857683 A1 | 6/2000 |
|---|---|---|
| EP | 0179334 A2 | 4/1986 |

OTHER PUBLICATIONS

Alfred V. Aho, Ravi Sethi and Jeffrey D. Ullman; Compilers: Principles, Techniques, and Tools; pp. 731-732; Section 11.4; Additional-Wesley Publishing Company; USA (1988).

(Continued)

*Primary Examiner*—Philip Wang
(74) *Attorney, Agent, or Firm*—Venable LLP; Eric J. Franklin

(57) ABSTRACT

A method to revalidate a compiler intended for compilation of a user-written program for safety control in an industrial control system after it has been used. A test program is compiled a first time which test program is defined in a control language. The compiler is validated by verifying that the test program executes correctly. A first software is generated derived from the compiled test program intended for later comparison purposes. The test program is compiled a second time after the compilation of a user-written program. A second software is generated intended for a comparison based on the second compilation of the test program. The first software is compared with the second software, wherein the compiler is revalidated for any errors introduced between the first and the second compilation. Provided that the revalidation indicates no errors in the compiler, the user-written program is enabled to execute in a device with safety features for control of real world entities.

5 Claims, 4 Drawing Sheets

U.S. PATENT DOCUMENTS

| | | | |
|---|---|---|---|
| 5,577,253 | A | 11/1996 | Blickstein |
| 5,754,860 | A | 5/1998 | McKeeman et al. |
| 6,071,316 | A | 6/2000 | Goossen et al. |
| 6,223,337 | B1 | 4/2001 | Blume |
| 6,598,074 | B1 * | 7/2003 | Moller et al. ............... 709/204 |
| 2002/0046397 | A1 * | 4/2002 | Schmitt et al. .............. 717/125 |
| 2003/0135842 | A1 * | 7/2003 | Frey et al. ................... 717/121 |

OTHER PUBLICATIONS

Phil Brashear; Ada 9X and the Validation Test Suite; Aerospace and Electronics Conference, 1991, NAECON 1991, Proceedings of the IEEE 1991; pp. 623-626; vol. 2.

George C. Necula; Translation Validation for an Optimizing Compiler, Proceedings of the *ACM SIGPLAN Conference on Programming Language Design and Implementation*; 2000; pp. 1-12.

* cited by examiner

REVALIDATION OF A COMPILER FOR SAFETY CONTROL

TECHNICAL FIELD

The present invention concerns revalidation of a compiler of control language for use in an industrial control system. In particular the invention reveals a method to revalidate a compiler, after it has been used for compilation of a user-written program, which is intended for safety control of real world entities. The user-written program subject to compilation by the compiler is intended for execution in a device, which comprises functionality that adds safety features to an industrial control system. The invention ensures that no fault is introduced into the device due to error in the compiler code. Such an error may, for instance, occur during distribution of the compiler code. An error can also occur due to failure in a computer's memory when the compiler is run or on a disk where the compiler code is stored. The invention ensures that no such fault is introduced into the control of real world entities which otherwise could lead to accidents that harm people or cause damage to the environment.

BACKGROUND ART

Industrial control systems are applied, for instance, in manufacturing and process industries, such as chemical plants, oil production plants, refineries, pulp and paper mills, steel mills and automated factories. Industrial control systems are also widely used within the power industry. Such industrial control systems may need to comprise or be combined with devices that add safety features. Examples of processes that require additional safety features to what a standard industrial control system provides are processes at offshore production platforms, certain process sections in nuclear power plants and hazardous areas in chemical plants. Safety features may be used in conjunction with safety shutdown, fire and/or alarm systems as well as for fire-and-gas detection.

An example of an industrial control system, which includes a safety critical function, is described in DE19857683 "Safety critical function monitoring of control systems for process control applications has separate unit". The system has a main controller bus coupled to different processors via a number of decentralized data receivers.

The use of general-purpose computer systems raises issues in that a user-written program does not become affected by a fault in the compiler code during execution.

"Compilers: Principles, techniques and tools" by Alfred V. Aho, Ravi Sethi and Jeffrey D. Ullman published 1988 by Addison-Wesley publishing company, includes a discussion on verification of general-purpose compilers. Page 731 paragraph 11.4 "Testing and maintenance" deals with the verification of compilers, prior of using it, according to standard software testing. One approach, suggested in the book, is the "regression" test. A suite of test programs is maintained, and whenever a compiler is modified, the test programs are compiled using both the new and old version of the compiler. Any difference in the target programs produced by the two compilers is reported to the compiler writer. Further the book points out that choosing the programs to include in a test suite is a difficult problem.

Prior art in the area of compilation technology includes methods and systems for compiler optimization. U.S. Pat No. 5,577,253 "Analyzing inductive expressions in a multilanguage optimizing compiler" describes a method executed in a computer system where a plurality of optimizations is performed by a generic compiler back-end using induction variables. This patenting optimization technique does not address the correctness of a compiler at a later time.

U.S. Pat. No. 6,071,316 "Automated validation and verification of computer software" shows a method for verifying that a source code, which has been compiled, executes all different paths in the code. This is not concerned with the compiler correctness.

A remaining problem in the area of safety control of real world entities is to ensure the highest possible reliability of a user-written program.

Another problem relating to industrial control systems is that the complexity of system software distribution (such as via the Internet) has led to an increased risk of errors occurring in the compiler software.

The inventors have found that there is a need to ensure that a compiler for software with the purpose of safety control of real world entities does not change its way to produce code while it is distributed, stored as binary code or loaded into RAM.

SUMMARY OF THE INVENTION

An object of the present invention is to provide a method to revalidate a compiler intended for compilation of a user-written program for execution of safety control in an industrial control system, after it has been used.

This and other objects are fulfilled by the present invention according to a method described in claim 1. Advantageous embodiments are described in sub-claims.

With the present invention a test program, defined in a control language, is compiled. By verifying that the test program executes correctly, the compiler is validated. A first software means for later comparison purposes is generated. After compilation of a user-written program, the test program is compiled. Based on this compilation of the test program a second software means is generated. The compiler is revalidated for errors introduced between the first and second compilation by comparing the first and second software means. Provided that the revalidation indicates no errors in the compiler, the user-written program is enabled to execute in a device with safety features for control of real world entities.

The user-written program subject to compilation by the compiler is intended for execution in a device, which comprises functionality that adds safety features to an industrial control system. As mentioned above, a method according to the invention includes steps which showhow to generate a first and second software means based on a compiled test program. Typically, the first software means is generated at the time of establishing a new version or revision of the compiler of a control language. The first software means is typically associated with the revision or version of the compiler code at hand. The method comprises steps whereby a second software means is generated after compilation of a user-written program. The method comprise steps in which the first and second software means are used to revalidate the compiler by comparing the first software means with the second software means. The first software means and the second software means are derived from the compiled test program by use of the same principles.

The invention facilitates to ensure that no fault is introduced into the industrial control system due to error in the compiler code or its execution environment. Such an error may, for instance, occur during distribution of the compiler code or an error can be due to failure in a computer's memory or failure in a disk where the compiler code is stored. An error in the compiler code can also occur due to faults in a computer register, a stack memory or in a CPU.

A particularly useful feature of the invention is that it facilitates to ensure that no such fault is introduced into the device for safety control of real world entities which otherwise could lead to accidents that harm people or cause damage to the environment.

The user-written program is typically written in control language, for instance based on IEC 61131-3.

An aim of the invention is to detect a fault in the compiler code or its execution environment. The invention detects errors in the compiler code at any time of compilation, which ensures a high reliability of safety-critical user-written program compiled by said compiler.

A further object of the invention is to provide a computer program product containing software code means loadable into the internal memory of a general-purpose computer or workstation and/or a device, which computer program products has software means to execute at least one step of the above described method.

Yet a further object of the invention is to provide a computer program comprising computer code means and/or software code portions for making a computer or processor perform any of the steps of the above described method.

BRIEF DESCRIPTION OF THE DRAWINGS

The present invention will be described in more detail in connection with the enclosed schematic drawings.

DETAILED DESCRIPTION OF THE INVENTION

Figure 1:
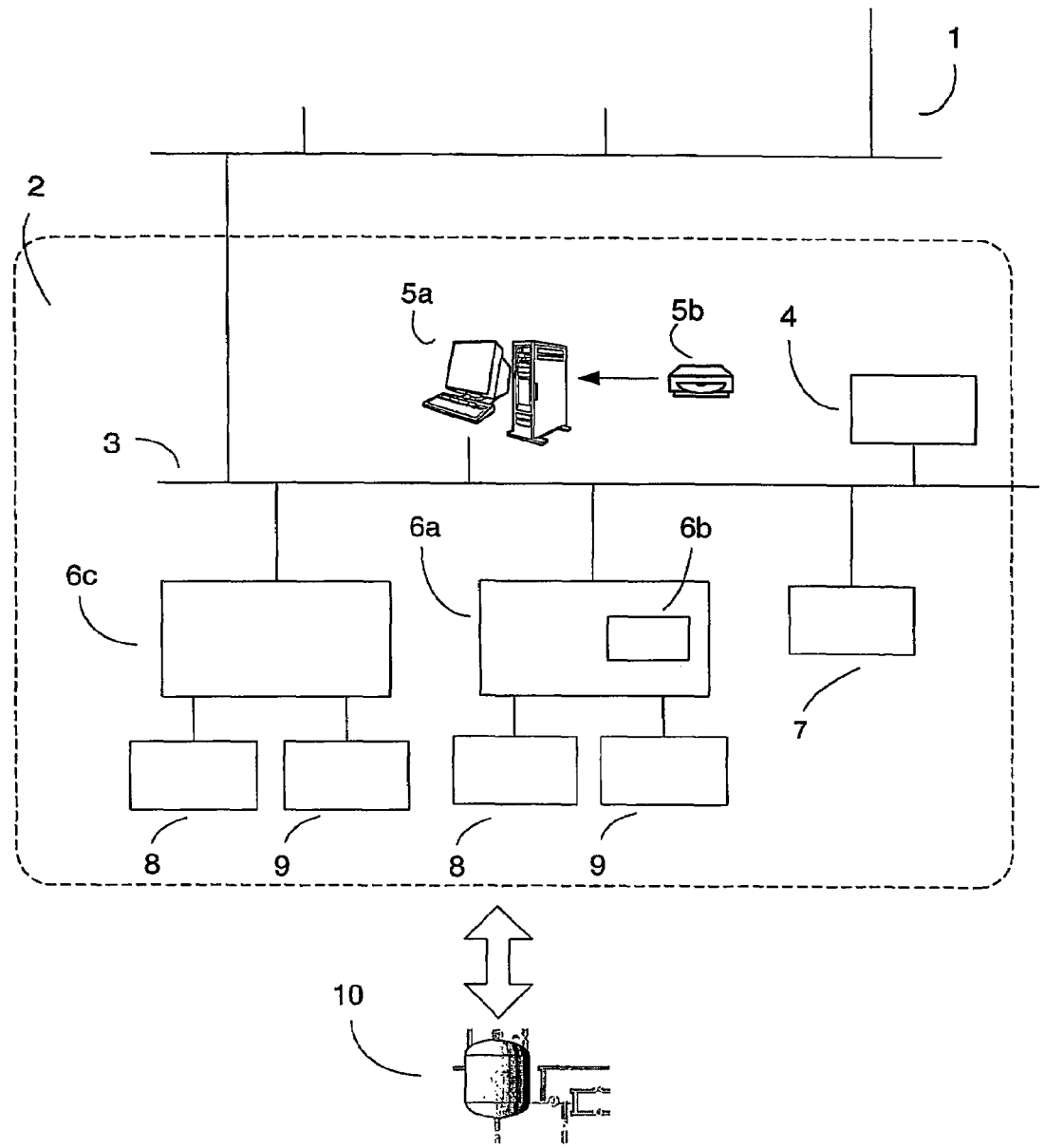
FIG. 1 shows a schematic overview of an industrial control system comprising a computer loaded with compiler code and a device with safety control features.

FIG. 1 shows a schematic diagram of an industrial control system 2 with a device 6a comprising safety features 6b. A user-written program intended for safety control of real world entities 10 is typically compiled in a workstation 5a or in a general-purpose computer. Such a workstation 5a or general-purpose computer is connected by communication means 3 to the device 6a. The communication means 3 is based on communication standards such as fieldbus technology or such as TCP/IP. The industrial control system 2 comprises a multitude of different devices such as controllers 6c, PLCs 7, operator stations or process portals 4 and process I/O 8. The above-mentioned devices may exist in any number and in combination with other devices common in an industrial control system. The device 6a comprising safety features 6b may be an individual device such as a PLC or a controller. The safety features are such that the device and/or the industrial control system comply with safety standards such as Safety Integrity Levels (SIL) as defined in the standard IEC 61508. The device may also comprise one or several software modules with safety features added to the device. The device 6a is connected to real world entities 10 subject to safety control via communication means such as a fieldbus or process I/O. Examples of real world entities are actuators, instruments, motors, valves, pumps, fans etc. A real world entity may also be a group of entities or a system of entities.

A device 6a for safety applications in a process control system 2 typically executes user-written applications described in a high-level language derived from the standard IEC 61131-3, which is well known to a person skilled in the art. Hence, the compiler 22 is typically a compiler for a high-level language derived from the standard IEC 61131-3.

Hereafter a release, a version or a revision of the compiler is called the compiler.

Validating a compiler for safety control is typically made at a software factory. A software factory is in this context a location where sufficient and certified test equipment as well as qualified personnel is available to perform tests and validation of the compiler. Validation of the compiler and the associated tests should be substantial. The tests should, for instance, ensure that the compiler 22 and the safety features meet requirements of safety certification. Also other requirements need to be met such as sufficient performance in order for other applications or programs to execute in the industrial control system 2. The validation of the compiler comprises verification that applications execute correctly in the device for safety control of real world entities.

The invention discloses that, in addition to the above described validation of a compiler, a test program 20 is established where the purpose of the test program 20 is to use it as input for revalidation of the compiler 22 outside the software factory. A test program 20 should include all logic of the control language, which is used for safety control applications. The definitions used in a typical test program are typically derived from the IEC 61131-3 standard. A preferred test program is built by using all languages, all functions and all language constructs. This in order to ensure that the compiler 22 parses and checks all logic expressions during compilation of the test program which later are to be used in a user-written program 21.

In an embodiment of the invention a version or revision of the compiler from the software factory is associated with the test program. The test program is at least partly used in the validation of the compiler at the software factory. A first software means intended for later comparison purposes is also associated with the version or revision of the compiler. It is further advantageous to distribute the test program together with the release, version or revision of the compiler.

Figure 2:
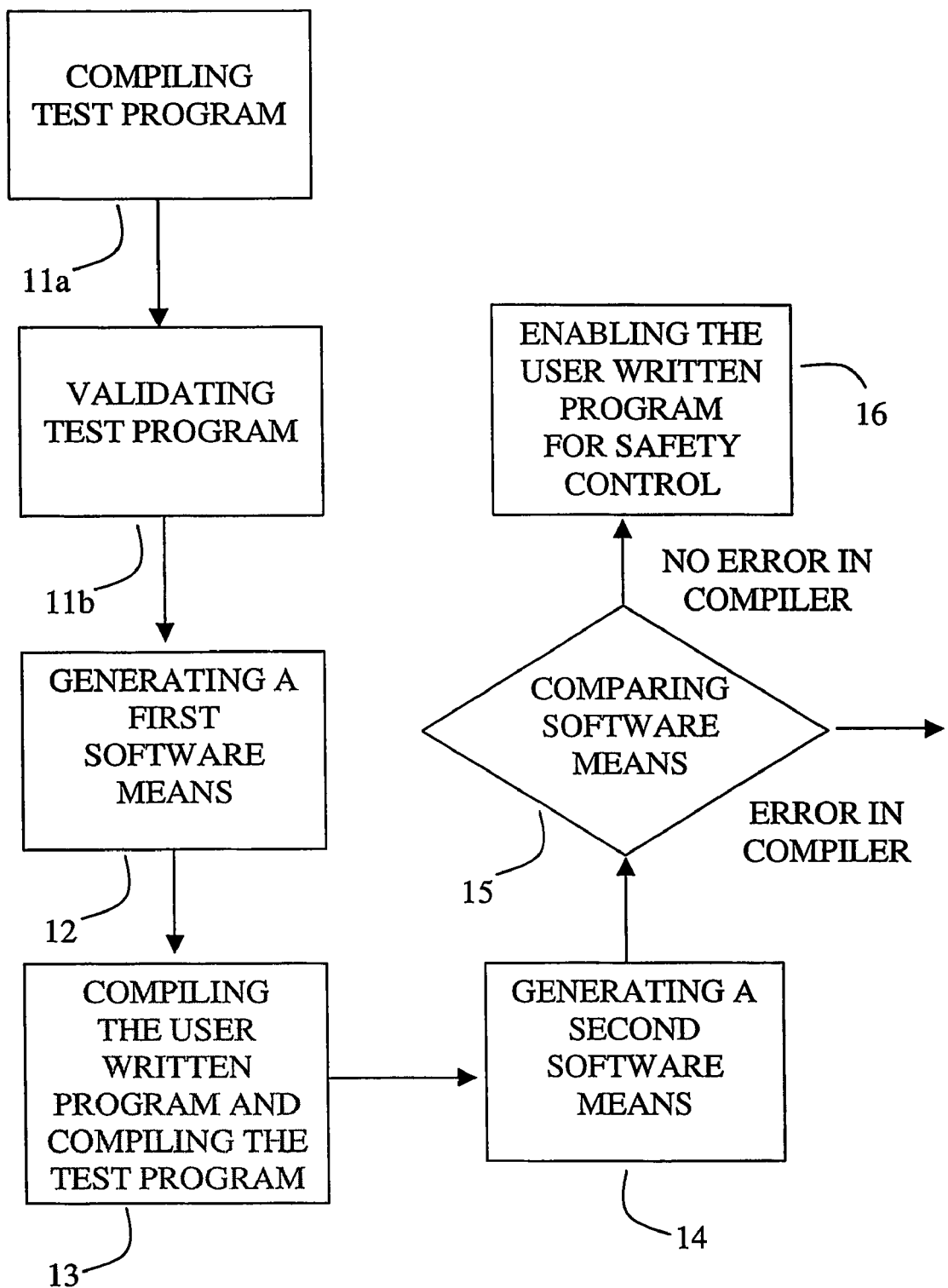
FIG. 2 shows a schematic flowchart of a method based on the invention.

FIG. 2 shows a schematic flow chart of a method based on the invention. The test program 20 is defined in a control language. The method comprises the step of compiling 11a the test program by means of the compiler. Further the method comprises the step of validating 11b the compiler by verifying that the test program executes correctly.

FIG. 2 also shows that the method comprises the step of generating a first software means 12. The first software means is dependent on the executable code of the test program 20. The first software means may have many embodiments. In one embodiment the first software means 23 comprise the original executable code of the compiled test program. In another embodiment generating 12 a first software means comprises the calculation of a check-sum and/or a code for cyclic redundancy check. In such an embodiment, the check-sum and/or the code for cyclic redundancy check is/are calculated with the compiled test program as one input. Hereafter a code for cyclic redundancy check is called a CRC. A CRC can be calculated or derived in several ways. For instance, a CRC may be of a length of 16 bits or 32 bits. The 16-bit polynomial CRC-CCITT ($X^{16}+X^{12}+X^5+1$) or the 16-bit polynomial ($X^{16}+X^{15}+X^2+1$) is an example of a polynomial suitable to be used in embodiments of the invention. An example of a 32-bit polynomial, which can be used to calculate a CRC, is ($X^{32}+X^{26}+X^{23}+X^{22}+X^{16}+X^{12}+X^{11}+X^{10}+X^8+X^7+X^5+X^4+X^2+X+1$) The mentioned 32-bit polynomial is defined in the Ethernet standard IEEE 802.3 and is a preferred polynomial to use in embodiments of the invention. In an alternative embodiment a checksum, such as a parity check, could be used.

FIG. 2 shows that a method based on the invention comprises the step of compiling 13 the test program 20 a second time. Compiling 13 the test program 20 is made after the compilation of a user-written program 21. The time lag between generating 12 the first software means 23, 35 and compiling 13 the test program 20 a second time is, typically, several days or weeks. The time lag may be up to several years. During the time between generating 12 the first software means and compiling 13 the test program a second time, an error in the compiler code might have occurred. Such an error may, for instance, occur during distribution of the compiler code or an error can be due to failure in a computer's memory or failure in a disk where the compiler code is stored. An error in the compiler code can also occur due to faults in a computer register, a stack memory or in a CPU where the compiler runs.

Figure 3:
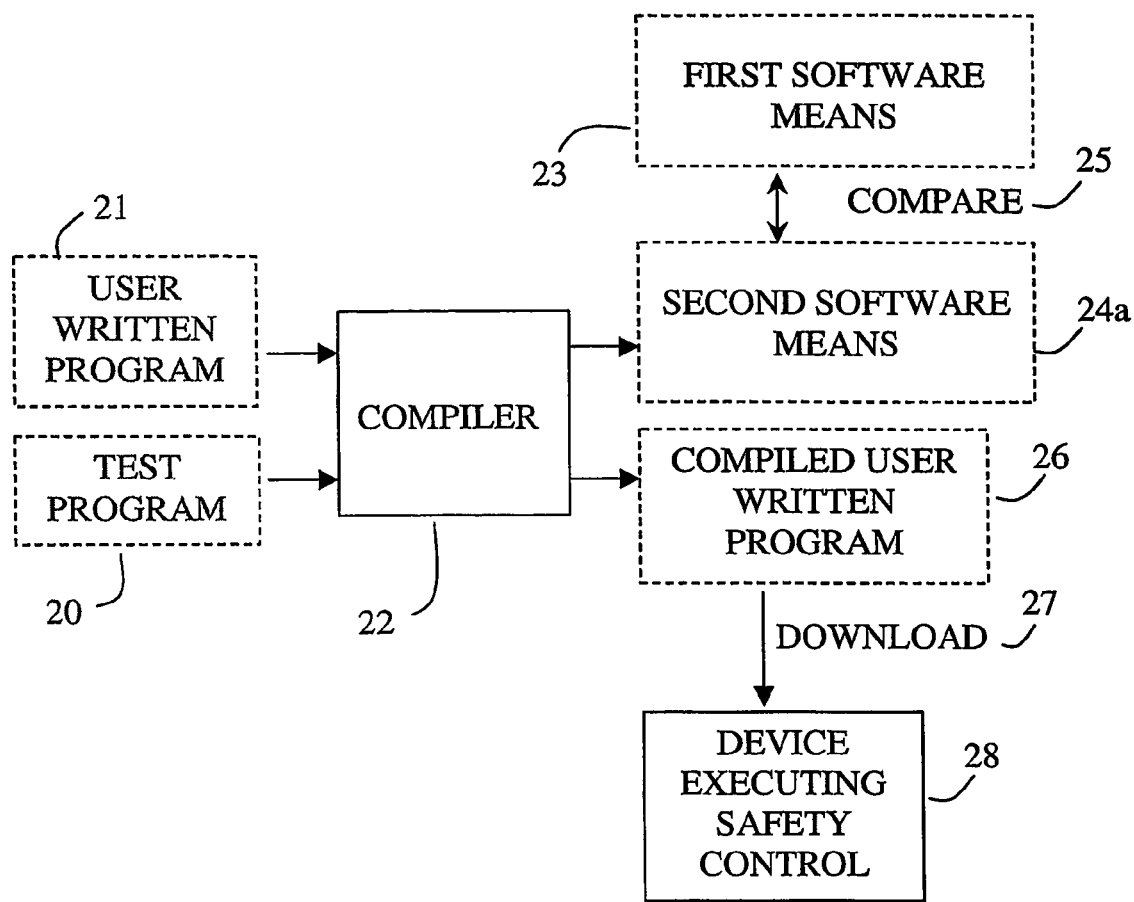
FIG. 3 shows a simplified diagram of an embodiment of the invention in which the compilation of the test program is performed after the compilation of a user-written program. The compiled test program is compared with a previous compilation of the test program.
Figure 4:
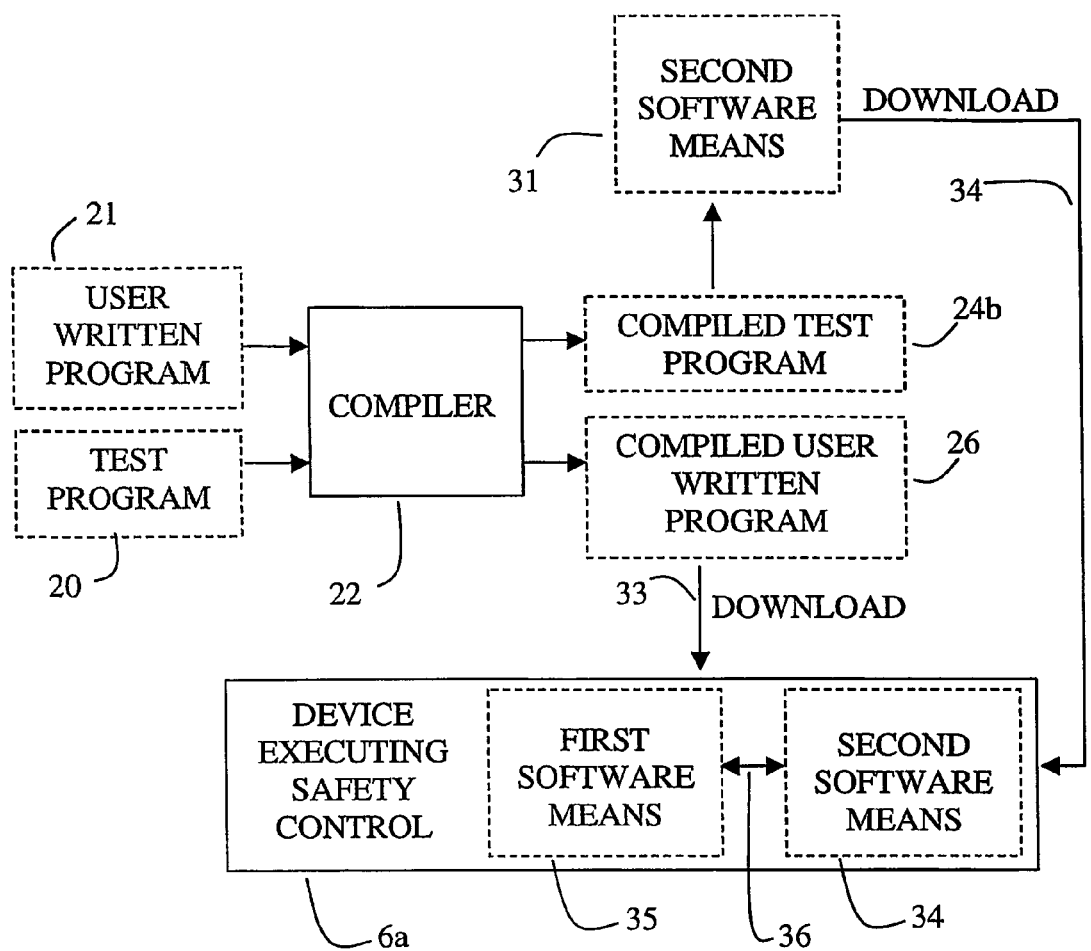
FIG. 4 shows a simplified diagram of another embodiment of the invention where the compilation of the test program is performed after the compilation of a user-written program. The figure shows that the second software means is downloaded to a device executing safety control where it is compared with the first software means.

Further, FIG. 2 shows that the method comprises the step of generating 14 a second software means 24a, 31 based on the second compilation of the test program 20. The step of generating the second software means 24a, 31 is based on the same principles as the previous step of generating 12 the first software means. As with the first software means, the second software means may have many embodiments. In one embodiment, the second software means 24a comprises the executable code of the second compilation of the compiled test program 20. In another embodiment generating 14 the second software means comprises a calculation of a check-sum and/or a code for cyclic redundancy check. Alternative ways of calculating a check-sum and/or a code for cyclic redundancy check are described in more detail in the above description of generating the first software means. FIG. 3 shows a more detailed overview of generating 14 a second software means 24a and the following steps of comparing 15 software means and enabling 16 the user-written program 26. FIG. 4 indicates that in an alternative embodiment of the invention the second software means 31 is downloaded to the device 6a.

FIG. 2 also shows that the method comprises the step of comparing 15 the first software means with the second software means. FIG. 3 shows that in one embodiment of the method the comparing step is performed by means of the same workstation 5a or general-purpose computer as that in which the compiler 22 is installed. In such an embodiment, the comparing step 15 of the first software means 23 and the second software means 24a may be implemented by use of standard features provided by an operating system.

In another embodiment, the comparing step 15 is performed by means of the device 6a. FIG. 4 shows an overview of such an embodiment. In such an embodiment, it is preferable that the first software means 35 be down-loaded to the device 6a together with the system software. FIG. 4 indicates that the first software means 35 typically has been down-loaded to the device 6a before the second compilation of the test program 20. The second software means 31 is down-loaded 34 in conjunction with a successful compilation of the user-written program 26.

Comparing 15 the software means does, in one embodiment of the invention, involve a comparison of the reminder values—and not between the values where the reminder is included in the calculation. In the latter case, the value will be 0 and a comparison between 0 and 0 may result in the stored calculation being placed in a memory where some or all bits are stuck at 0 and the comparison may give an invalid result. That is why a comparison between non-zero values (such as reminder values) yields a higher probability to discover faults.

In an alternative embodiment of the invention, the steps of compiling the test program 13, generating 14 a second software means and comparing 15 the first and second software means are repeated any number of times. In such an alternative embodiment, an additional source of data may be used with the purpose of generating a change in both the first and second software means. An example of such an embodiment is that the generating step of the second software means comprises an additional step of combining a variable that changes over time with the second software means. The variable that changes over time typically relates to the second compilation of the test program. In the same alternative embodiment, the comparing step may comprise an additional step of down-loading the variable that changes over time. It is advantageous to use a date&time stamp. In one embodiment according to FIG. 4, the date&time stamp is downloaded to the device 6a and the date&time stamp is combined with the first software means 35. The advantage of using a variable that changes over time, such as a date&time stamp, is to generate a change in the first and second software means over time. Such a change eliminates the possibility that one unit in the download chain stores the second software means during a download and during a later download sends that second software means instead of the new one it receives.

FIG. 2 also shows that the method comprises the step of enabling 16 the compiled user-written program 26 to execute in the device 6a with safety features for control of real world entities 10. The enabling step of the method is performed provided that no errors were detected in the compiler in the previous steps.

A method according to the invention is at least partly performed under the control of a set of computer-readable instructions contained in a computer program storage device.

The invention also discloses a computer program product 5b intended for safety control in an industrial control system 2. The computer program product 5b comprise functionality of enabling a user-written program to execute after revalidating the compiler according to the above described methods. Further, the computer product comprises software means for carrying out a further action to receive a signal sent across the Internet 1 comprising the first software means 35.

The invention also discloses a computer program comprising computer code means for making a computer or processor perform any of the steps of the above described method.

The foregoing disclosure and description of the invention are illustrative and explanatory thereof, and various changes in the components, processing and computational steps and procedures, as well as in the details of the illustrated circuitry and method of operation may be made without departing from the spirit of the invention.

The invention claimed is:

1. A method to revalidate a compiler and a compiler execution environment intended for compilation of a user-written program for safety control in an industrial control system after use of the compiler and the compiler execution environment, the method comprising:

compiling a test program a first time with a compiler which test program is defined in a control language;

validating the compiler and the compiler execution environment by verifying that the test program executes correctly;

generating a first software element derived from the compiled test program intended for later comparison purposes;

compiling the test program a second time after the compilation of a user-written program wherein the test program and the user-written program are compiled with the compiler used to compile the test program the first time;

generating a second software element intended for a comparison based on the second compilation of the test program;

downloading the first software element and the second software element to a device with safety features;

comparing, in the device with safety features, the first software element with the second software element to determine whether errors were introduced between the first and the second compilation;

enabling, provided that the revalidation indicates no errors in the compiler and the compiler execution environment, the user-written program to execute in the device with safety features for control of real world entities; and when the user-written program is enabled, executing said user-written program in said device with safety features for control of real world entities.

2. The method according to claim 1, wherein the software element is a check-sum or a code for cyclic redundancy check.

3. The method according to claim 2, wherein the comparing further comprises downloading a variable that changes over time, which is downloaded in a message comprising the check-sum or code to the device, where the variable that changes over time is used to achieve a change in the message.

4. The method according to claim 1, wherein the test program is defined in a control language derived from the standard IEC 6-1131.

5. A computer program product, comprising:

computer readable medium; and computer program instructions recorded on the computer readable medium and executable by a processor for carrying out a method to revalidate a compiler and a compiler execution environment intended for compilation of a user-written program for safety control in an industrial control system after use of the compiler and the compiler execution environment, the method comprising:

compiling a test program a first time with a compiler which test program is defined in a control language;

validating the compiler and the compiler execution environment by verifying that the test program executes correctly;

generating a first software element derived from the compiled test program intended for later comparison purposes;

compiling the test program a second time after the compilation of a user-written program wherein the test program and the user-written program are compiled with the compiler used to compile the test program the first time;

generating a second software element intended for a comparison based on the second compilation of the test program;

downloading the first software element and the second software element to a device with safety features;

comparing, in the device with safety features, the first software element with the second software element to determine whether errors were introduced between the first and the second compilation;

enabling, provided that the revalidation indicates no errors in the compiler and the compiler execution environment, the user-written program to execute in a device with safety features for control of real world entities; and when the user-written program is enabled, executing said user-written program in said device with safety features for control of real world entities.

\* \* \* \* \*